US011843648B2

(12) United States Patent
Lewis et al.

(10) Patent No.: US 11,843,648 B2
(45) Date of Patent: *Dec. 12, 2023

(54) IDENTIFYING INSERTION POINTS FOR INSERTING LIVE CONTENT INTO A CONTINUOUS CONTENT STREAM

(71) Applicant: Google LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,618

(22) Filed: Sep. 2, 2021

(65) Prior Publication Data

US 2021/0400099 A1 Dec. 23, 2021

Related U.S. Application Data

(63) Continuation of application No. 16/154,672, filed on Oct. 8, 2018, now Pat. No. 11,115,448, which is a
(Continued)

(51) Int. Cl.
*H04N 21/2187* (2011.01)
*H04L 65/60* (2022.01)
(Continued)

(52) U.S. Cl.
CPC .............. *H04L 65/60* (2013.01); *G11B 27/02* (2013.01); *H04N 21/2187* (2013.01);
(Continued)

(58) Field of Classification Search
CPC .... H04L 65/60; G11B 27/02; H04N 21/2187; H04N 21/26233; H04N 21/26258; H04N 21/41407; H04N 21/431; H04N 21/4825
See application file for complete search history.

(56) References Cited

U.S. PATENT DOCUMENTS

2004/0068758 A1 4/2004 Daily et al.
2006/0059535 A1* 3/2006 D'Avello ................ G06F 16/68
725/139
(Continued)

FOREIGN PATENT DOCUMENTS

EP 1791130 A2 5/2007

OTHER PUBLICATIONS

International Search Report and Written Opinion dated Jun. 6, 2016 for PCT/US2016/021333, 13 pages.

*Primary Examiner* — Aftab N. Khan
(74) *Attorney, Agent, or Firm* — Lowenstein Sandler LLP

(57) ABSTRACT

A method for identifying insertion points for inserting live content into a continuous content stream is disclosed. The method includes identifying a first particular live content item included in a continuous content stream. The method determines a first live content item for presentation based on one or more interesting portions of the first live content item, wherein the one or more interesting portions are identified based one or more selection criteria, and wherein a first interesting portion comprises a start time. The method further causes the first live content item to be presented by the client device at the start time of the first interesting portion during playback of the first particular item.

20 Claims, 8 Drawing Sheets

Related U.S. Application Data continuation of application No. 14/692,775, filed on Apr. 22, 2015, now Pat. No. 10,097,605.

(51) Int. Cl.
*H04N 21/262* (2011.01)
*H04N 21/414* (2011.01)
*H04N 21/431* (2011.01)
*H04N 21/482* (2011.01)
*G11B 27/02* (2006.01)

(52) U.S. Cl.
CPC . *H04N 21/26233* (2013.01); *H04N 21/26258* (2013.01); *H04N 21/41407* (2013.01); *H04N 21/431* (2013.01); *H04N 21/4825* (2013.01)

(56) References Cited

U.S. PATENT DOCUMENTS

| | | | |
|---|---|---|---|
| 2010/0114853 A1* | 5/2010 | Fisher | G11B 27/034 709/219 |
| 2011/0022685 A1 | 1/2011 | Walker et al. | |
| 2012/0167132 A1* | 6/2012 | Mathews | H04N 21/812 725/32 |
| 2013/0031206 A1 | 1/2013 | Miyazaki | |
| 2014/0047073 A1 | 2/2014 | Berne | |
| 2014/0094943 A1* | 4/2014 | Bates | H04N 21/00 700/94 |
| 2014/0289241 A1 | 9/2014 | Anderson | |
| 2014/0344852 A1* | 11/2014 | Reisner | H04N 21/23424 725/32 |
| 2015/0113058 A1* | 4/2015 | Zhang | H04L 65/403 709/204 |
| 2015/0295799 A1 | 10/2015 | Gayles | |

* cited by examiner

IDENTIFYING INSERTION POINTS FOR INSERTING LIVE CONTENT INTO A CONTINUOUS CONTENT STREAM

RELATED APPLICATIONS

This application is a continuation application of U.S. patent application Ser. No. 16/154,672, filed on Oct. 8, 2018, entitled "IDENTIFYING INSERTION POINTS FOR INSERTING LIVE CONTENT INTO A CONTINUOUS CONTENT STREAM," which is now allowed, and which is a continuation of U.S. patent application Ser. No. 14/692,775, filed on Apr. 22, 2015, entitled "IDENTIFYING INSERTION POINTS FOR INSERTING LIVE CONTENT INTO A CONTINUOUS CONTENT STREAM," now U.S. Pat. No. 10,097,605, which are both hereby incorporated by reference in their entirety.

TECHNICAL FIELD

This disclosure relates to the field of content sharing platforms, in particular, to identifying insertion points for inserting live content into a continuous content stream.

BACKGROUND

On the Internet, social networks allow users to connect with each other and share information. Many social networks include a content sharing aspect that allows users to upload, view, and share content, such as video content, image content, audio content, and so on (which may be collectively referred to as "media items", "media content", "content items", or "content"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, listen to digital music, read articles, etc.). Content recommendation services may generate content recommendations for a user based on a number of factors, such as content popularity, personal viewing history, and user affinity for a type of content.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In one implementation, a method identifying insertion points for inserting live content into a continuous content stream is disclosed. The method includes identifying (e.g., by a processing device) a live content item to include in a continuous content stream, and identifying an interesting portion of the live content stream, the interesting portion corresponding to a time duration. The method further includes computing an estimated end time of a first content item included in the continuous content stream, and scheduling the live content item to be included in the continuous content stream as a next content item to be presented after the first content item in response to a determination that the estimated end time of the first content item occurs within the time duration.

In another implementation, a method for selectively modifying scores of youth-oriented search results is disclosed. The method includes identifying a first on-screen element corresponding to a first content item of a content stream, and computing an estimated end time for playback of the first content item represented by the on-screen element. The method further includes selecting a second content item from a plurality of available content items, and determining whether the estimated end time coincides with an interesting portion of the second content item. The method further includes causing a second on-screen element to be displayed in response to determining that space is available in a user interface window for displaying the second on-screen element, the second on-screen element being representative of the second content item.

In one or more of the disclosed implementations, computing devices for performing the operations of the above described implementations are also disclosed. Additionally, in implementations of the disclosure, a machine-readable storage medium stores instructions for performing the operations of the above described implementations.

BRIEF DESCRIPTION OF THE DRAWINGS

The present disclosure is illustrated by way of example, and not by way of limitation, in the figures of the accompanying drawings, in which.

DETAILED DESCRIPTION

Figure 1A:
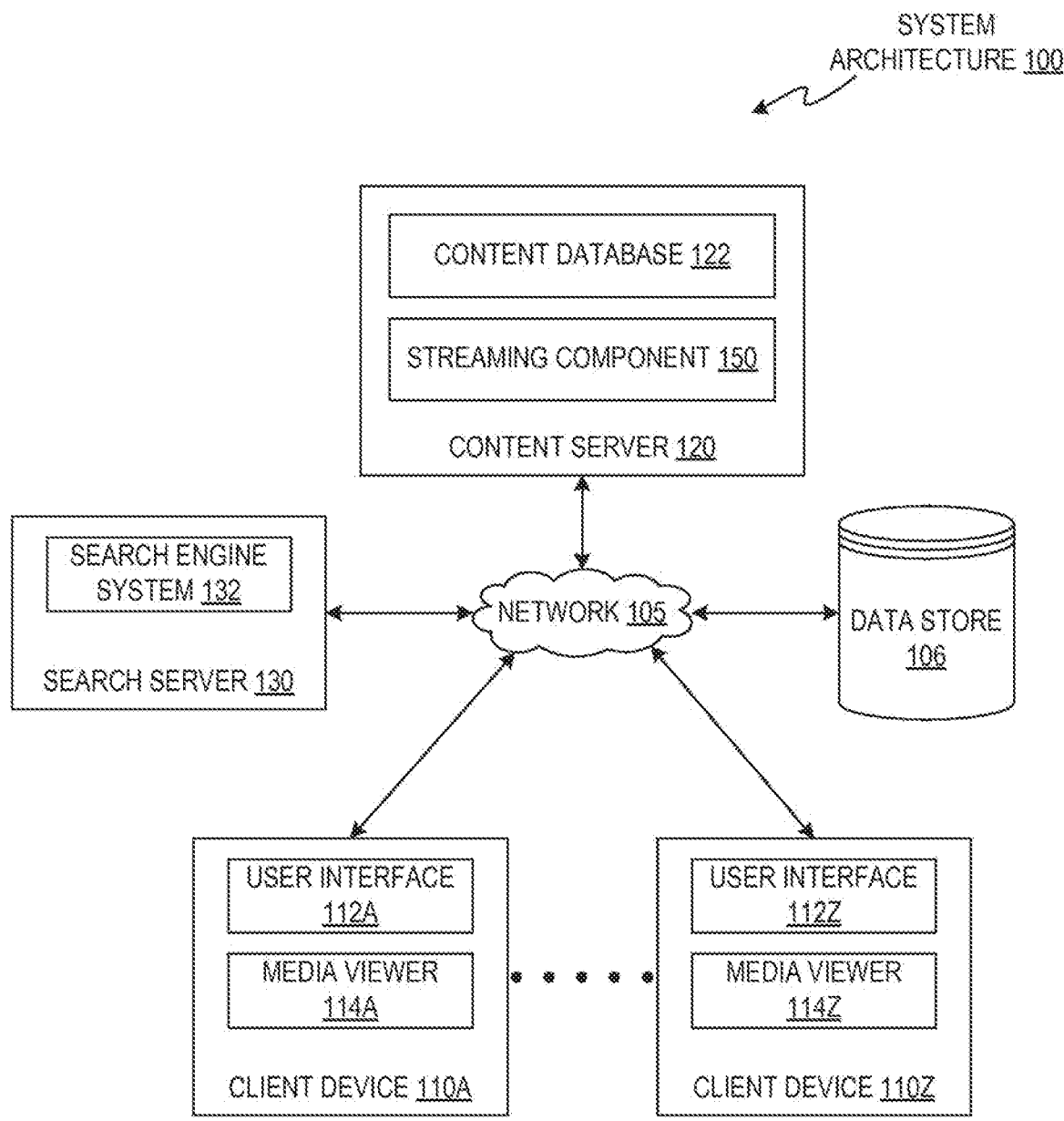
FIG. 1A illustrates an example system architecture in accordance with an implementation of the disclosure.

Implementations are described for identifying insertion points for inserting live content into a continuous content stream, thus allowing for the continuous streaming of both on-demand content (e.g., content having an adjustable playback schedule) and live content (e.g., content having a fixed schedule and presented in real-time, such as a broadcast) in an auto-play format. "Interesting portions" of live content may be identified and scheduled as part of the continuous content stream. For example, the live content may be annotated with start and stop times (as well as the scheduled start and stop times), intermission periods, and indications as to whether the content is best ingested from the beginning (e.g., such as a speech) or from the most current portion (e.g., a sports match). A client device receiving the continuous content stream may, for example, display previews of content that is to be presented next, with the previews being characteristic thumbnails or snapshots of scenes from the next content. For example, in implementations that combine both on-demand and live content into a single continuous stream, on-demand content may be represented by static thumbnails in the previews, and live content might be represented by a silent live stream. As used herein, the term "continuous content stream" refers to discrete content items, or portions thereof, that are arranged sequentially in time and are streamed in a continuous fashion one after another without requiring any input from a user at a receiving client device.

In general, live content is different from on-demand content (such as video on demand, or VOD) because live content is often not curated to remove un-interesting portions. Unlike on-demand content, live content often contains intermissions, resulting in varying bands of relevancy throughout the viewing session. Typically, the live content itself is streamed for a significant time before an interesting portion of the content becomes available, and frequently the live content continues for a period after the interesting portion has passed. Whether live content is interesting to a user, in many cases, is also dependent on the user viewing the content from the beginning rather than commencing playback halfway through. At any given time, however, interesting live content is difficult to find, unlike on-demand content, and is often not constantly entertaining. In traditional methods of streaming content, an interface allows a user to specifically choose a content item to view after he/she is done with the current content item (e.g., a "watch next" option). However, it is difficult to predict how much time or how many suggestions will pass before the user is presented with a live stream since the user always has the option to choose to skip to the next suggestion. Consequently, content services that stream on-demand content have been unable to incorporate live content in a continuous content stream while providing constant and relevant entertainment.

The present implementations provide a solution to these problems by identifying optimal insertion points for scheduling content in a continuous content stream. In some examples, a server side component might return an ordered list of recommended videos (including VOD and live videos), which may be arranged in the list based on a default relevance-based ordering. The list may also include a set of optimal times and time ranges for the videos to be recommended, and in some cases live content may be annotated with the optimal time ranges (which may be updated in real-time). When a new content item is to be recommended to the user, the client device may compare the current time to the optimal time listed for the live stream and choose to either move the live stream up to be the next recommended content item, push it back further in the list, remove it altogether, or even treat the live stream as VOD content instead of a live stream by commencing playback from the beginning. In some implementations, identifying the optimal insertion points may be performed server-side.

FIG. 1A illustrates an example system architecture 100, in accordance with an implementation of the disclosure, for providing on-demand and live content to a user in a continuous content stream, as well as identifying insertion points for inserting live content into the continuous content stream. The system architecture 100 includes client devices 110A-110Z, a data store 106, a content server 120, and a search server 130, with each device of the system architecture 100 being communicatively coupled via a network 105. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. The devices and components of the system architecture 100 may be a part of a content sharing platform. For example, one or more of the client devices 110A-110Z may be used to produce content (e.g., live and/or on-demand content) as well as share content over the network 105. Content may be stored, for example, using the data store 106. The content server 120 and the search server 130 may facilitate the sharing of the content between the client devices 110A-110Z.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and the data store 106 may configured to provide secure storage for private data.

The client devices 110A-110Z may each include computing devices such as personal computers (PCs), laptops, mobile phones, smart phones, tablet computers, netbook computers, etc. Client devices 110A-110Z may also be referred to as "user devices" or "mobile devices". An individual user may be associated with (e.g., own and/or use) one or more of the client devices 110A-110Z. The client devices 110A-110Z may each be owned and utilized by different users at different locations. As used herein, a "user" may be represented as a single individual (e.g., an adult or a child). However, other implementations of the disclosure encompass a "user" being an entity controlled by a set of users and/or an automated source. For example, a set of individual users federated as a community in a social network may be considered a "user".

Figure 2A:
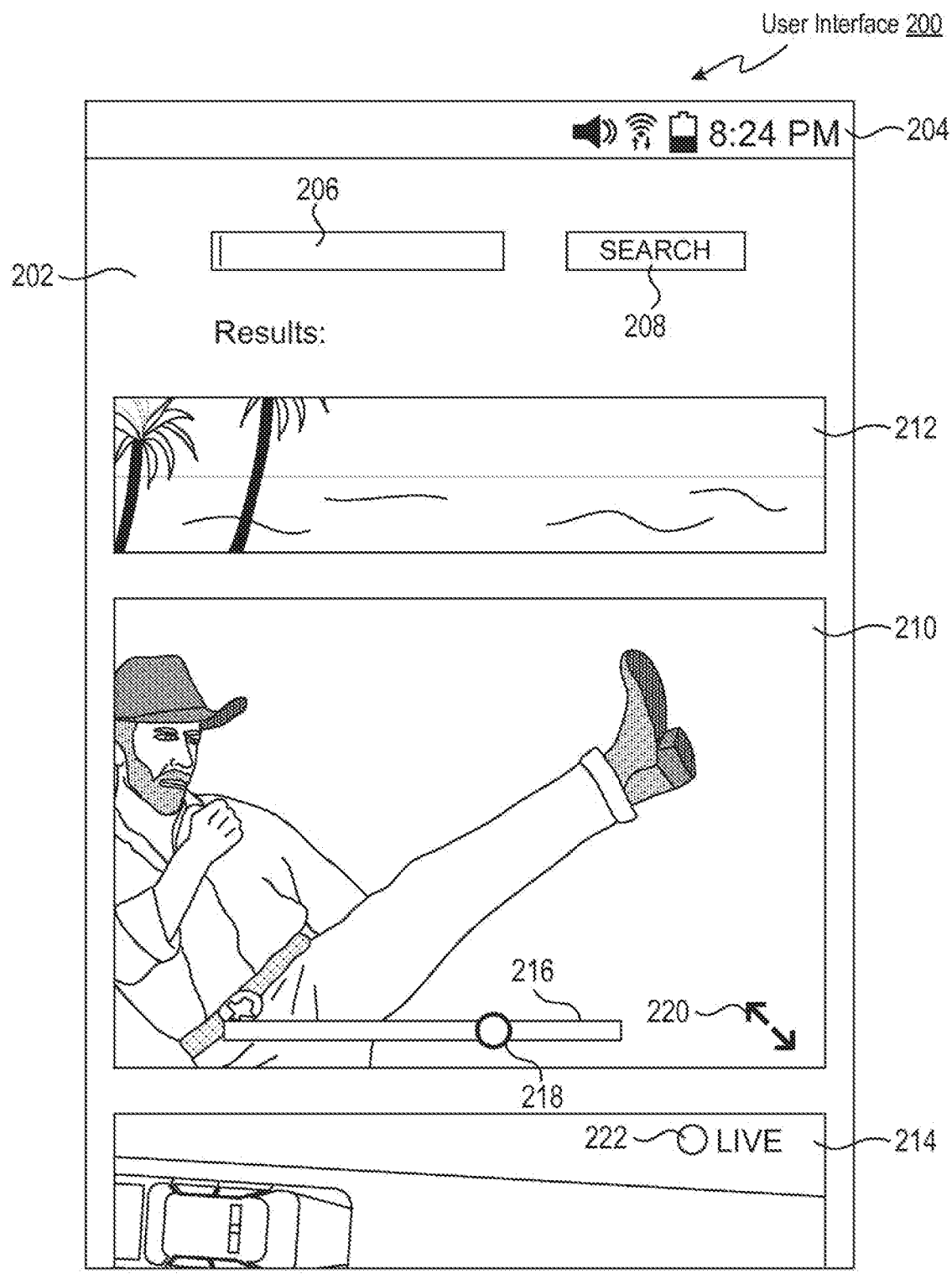
FIG. 2A illustrates an exemplary user interface for presenting a continuous content stream in accordance with an implementation of the disclosure.
Figure 2B:
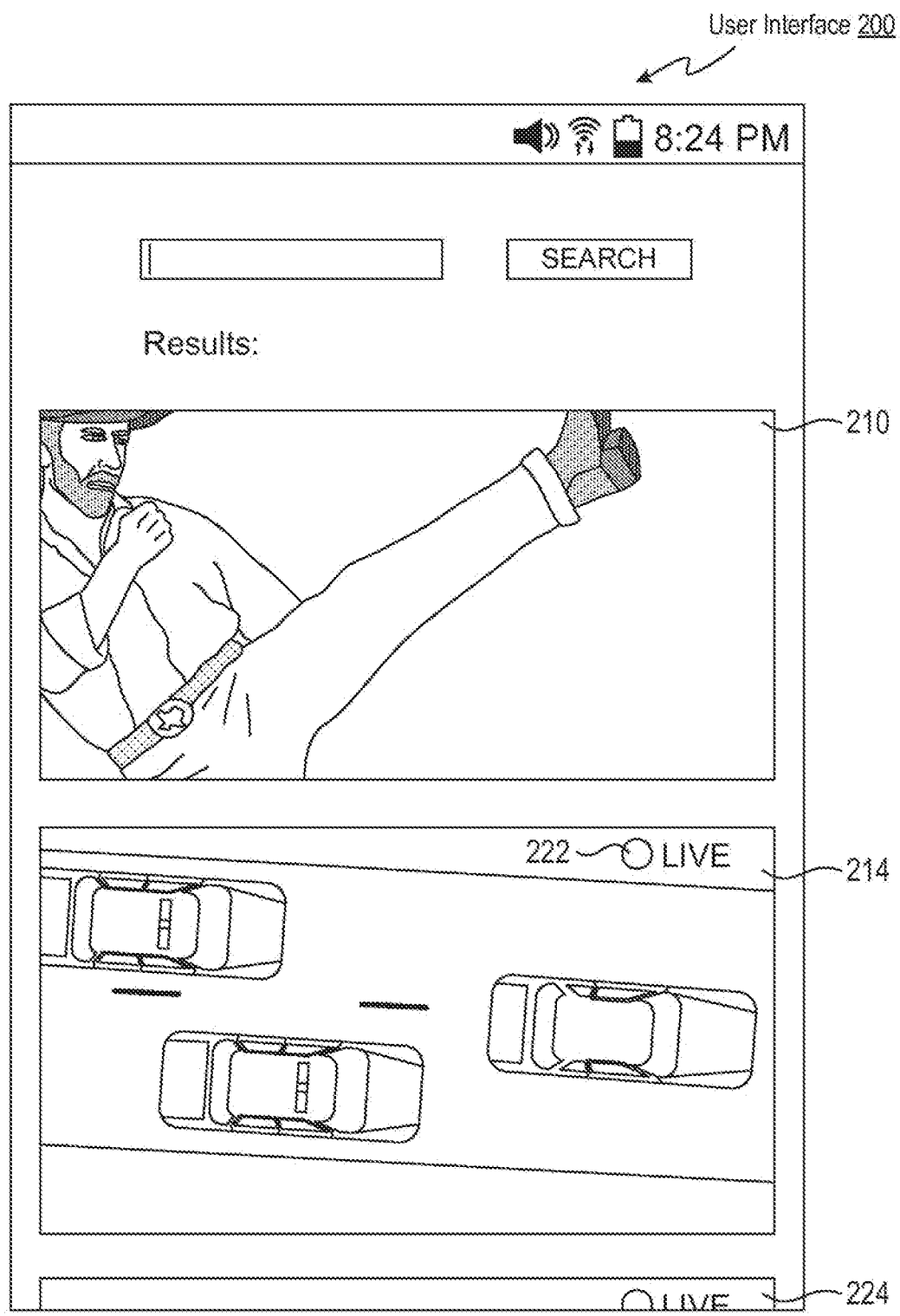
FIG. 2B illustrates advancement of content in the exemplary user interface of FIG. 2A in accordance with an implementation of the disclosure.

The client devices 110A-110Z may each implement user interfaces 112A-112Z, respectively. Each of the user interfaces 112A-112Z may allow a user of the respective client device 110A-110Z to send and receive information to/from each other, the data store 106, the content server 120, and the search server 130. For example, one or more of the user interfaces 112A-112Z may be a web browser interface that can access, retrieve, present, and/or navigate content (e.g., web pages such as Hyper Text Markup Language (HTML) pages) provided by the content server 120. As another example, one or more of the user interfaces 112A-112Z may allow a user of a respective client device 110A-110Z to submit a request for content to the search server 130, which may in turn facilitate the transfer of content (e.g., a content stream that includes live content and/or on-demand content) from the content server 120 to the respective client device 110A-110Z. In one implementation, one or more of the user interfaces 112A-112Z may be a standalone application (e.g., a mobile "app", conferencing software, etc.), that allows a user of a respective client device 110A-110Z to send and receive information to/from each other (e.g., user-shared content), the data store 106, the content server 120, and the search server 130. FIGS. 2A and 2B provide examples of user interfaces implementing a continuous content stream, and are discussed in greater detail below.

Each client device 110A-110Z also includes a media viewer 114A-114Z, respectively, that is implemented by a respective user interface 112A-112Z. In one implementation, the media viewers 114A-114Z may be applications that allow users to view content, such as images, videos, web pages, documents, etc. The media viewer 114A, for example, may be a web browser that can access, retrieve, present, and/or navigate content (e.g., web pages such as Hyper Text Markup Language (HTML) pages, digital media items, etc.) provided by a web server. The media viewer 114A may render, display, and/or present the content (e.g., a web page, a media viewer) to a user. The media viewer 114A may also display an embedded media player that is embedded in a web page. In another example, the media viewer 114A may be a standalone application (e.g., a mobile "app" or an application running on a network connected television) that allows users to view digital media items (e.g., digital videos, digital images, electronic books, etc.). The media viewers 114A-114Z may be provided to the client devices 110A-110Z (e.g., as downloadable software), for example, by the content server 120, the search server 130, or any other suitable source.

In one implementation, the content server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The content server 120 may be a server utilized by any of the client devices 110A-110Z or the search server 130 to retrieve/access content or information pertaining to content (e.g., content metadata including a title, a genre, a content label, etc.).

A media item may be consumed via the Internet and/or via a mobile device application. For brevity and simplicity, an online video (also hereinafter referred to as a video) is used as an example of a media item throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content server 120 may store media items, for example, using the data store 106.

In some implementations, the content server 120 may serve as a source of content that may be provided to any of the devices of the system architecture 100. In some implementations, more than one content server 120 may be utilized, with some specializing in particular types of content (e.g., a first content server that hosts video content, another content server that hosts music, etc.). The content server may host shared content, private content (e.g., content restricted to use by a single user or a group of users), commercially distributable content (e.g., on-demand content, purchasable content, live content, etc.). In one implementation, the content server 120 maintains a content database 122, which includes records of all available content, including content titles, descriptions, ratings, cross-references to related content or associated content, copyright information, licensing information, etc. In some implementations, the content server 120 may be combined with the search server 130 and/or the data store 106.

In one implementation, the search server 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to process a search queries received from the client devices 110A-110Z, generate lists of search results based on the search queries, and provide the search results to the requesting client devices 110A-110Z.

In one implementation, the search server 130 utilizes a search engine system 132 that may receive a search query (e.g., from one of the client devices 110A-110Z) and generate a set of search results of content items relevant to the search query, which may be subsequently transmitted back to the client device from which the query originated. The search engine system 132 may search for content items related to the search query (e.g., by searching descriptions of content from the content database 122, searching the body of web documents on the content server 120 or data store 106, etc.), for example, using any suitable search algorithm. The search engine system 132 may generate a set of search results by identifying content items relevant to the search query and generating a score for each content item. The search and scoring methodology performed by the search engine system 132 is outside of the scope of the present disclosure.

Although each of the content server 120, the search server 130, and the data store 106 are depicted in FIG. 1A as single, disparate components, these components may be implemented together in a single device or networked in various combinations of multiple different devices that operate together. Examples of such devices may include, but are not limited to, servers, mainframe computers, networked computers, process-based devices, and similar types of systems and devices. Some implementations of the disclosure may operate within a single server device or on multiple server devices. Other implementations of the disclosure may operate in a standalone system. In some implementations, one or more of the content server 120, the search server 130, or data store 106 are managed by a single entity. In some implementations, one or more of the content server 120, the search server 130, or the data store 106 are managed by different entities.

In general, functionality described in one implementation as being performed by the content server 120 or the search server 130 can also be performed by any of the client devices 110A-110Z in other implementations where appropriate. For example, the client device 110A may implement a software application that performs the functions of the streaming component 150. In addition, the functionality attributed to a particular component can be performed by different or multiple components operating together. The content server 120 and the search server 130 can also be accessed as a service provided to other systems or devices through appropriate application programming interfaces, and thus is not limited to use in websites.

Figure 1B:
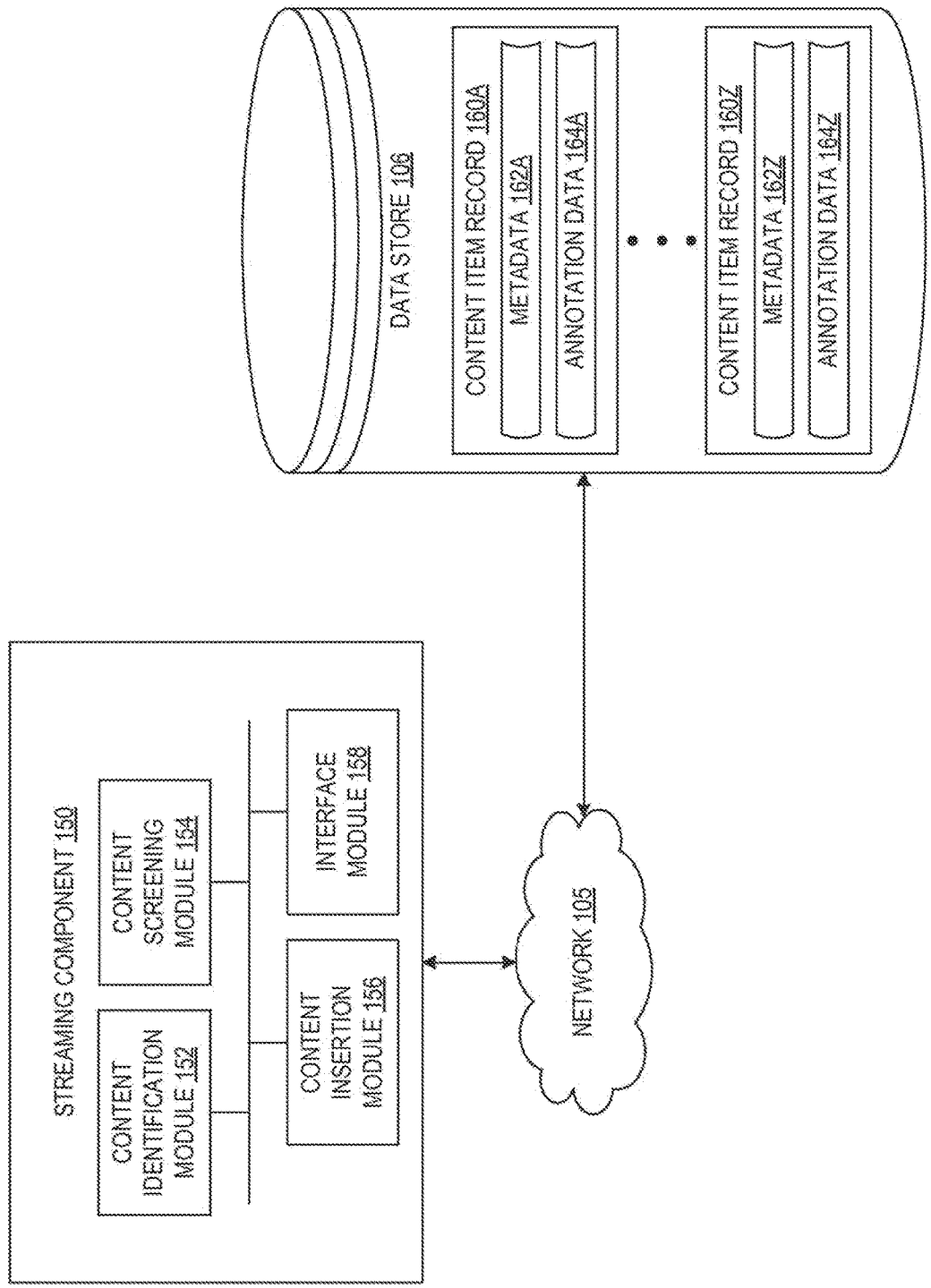
FIG. 1B is a block diagram illustrating a streaming component in accordance with an implementation of the disclosure.

FIG. 1B is a block diagram illustrating a streaming component 150 in accordance with an implementation of the disclosure. In one implementation, the streaming component 150 includes a content identification module 152, a content screening module 154, a content insertion module 156, and an interface module 158. More or fewer components may be included in the streaming component 150 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the streaming component 150 is communicatively coupled to the data store 106. For example, the streaming component 150 may be coupled to the data store 106 via a network (e.g., via network 105 as illustrated in FIGS. 1A and 1B). In another example, the streaming component 150 may be coupled directly to a server where the streaming component 150 resides (e.g., may be directly coupled to the content server 120). As described with respect to FIG. 1A, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers), and may be cloud-based. The data store 106 may be part of or distributed between any of the client devices 110A-110Z, the content server 120, and the search server 130, as described with respect to FIG. 1A.

In one implementation, the data store 106 includes content item records 160A-160Z corresponding to content items residing on the content server 120 (e.g., or another content source) and/or content items identifiable by the search server 130. In some implementations, the content item records 160A-160Z may be content item records of the content database 122. Each of the content item records 160A-160Z may include, respectively, metadata 162A-162Z, and may also include, respectively, annotation data 164A-164Z. The metadata 162A-162Z may correspond to data that are unique to their respective content items. Such data may include, for example, a content title, a content genre, a total playtime of the content, keywords associated with the content, names of individuals starring in the content, a producer of the content, copyright information, etc. The metadata 162A-162Z may have been generated when the associated content items were produced, and have been generated by a creator or creative entity of the associated content items.

The annotation data 164A-164Z may include data that is descriptive of their respective content items or portions thereof. For example, the annotation data 164A may include a description of a particular portion of the content item. The description may be, for example, a textual comment (e.g., editor commentary, a social annotation, etc.), an indication of an interesting portion of the content, a time duration of the interesting portion (e.g., a start time and an end time within the content), an indication of a non-interesting portion of the content and an associated time duration, an indication of a position to insert an advertisement (e.g., a location to insert a commercial break), an actual end time of the content, and an estimated end time of the content. In some implementations, when video content is played back on a client device (e.g., one of the client devices 110A-110Z), a description of the content may be displayed over the video or adjacent to the video as an annotation, and may appear at a particular time during playback.

In some implementations, if the content item is a live content item, the content item record may exist for the live content item even before it is viewable. For example, a source of the live content item may have generated the content item record 160A for the live content item, and the metadata 162A and the annotation data 164A may be accessible to one or more of the client devices 110A-110Z, the search server 130, or the content server 120 before, during, or after the live content item was made available. In some implementations, the annotation data 164A may be updated in real-time while the live content item is being consumed by one or more of the client devices. For example, social annotations may be generated in real-time by users of the client devices 110A-110Z, which may be associated with the live content item (e.g., stored in the corresponding content item record 160A) and may be made available to each user of the client devices 110A-110Z during or after consumption of the live content item. In some implementations, interesting portions of the live content item may be determined in real-time based on viewership. For example, a content server (e.g., the content server 120) may determine that a portion of the live content item is interesting in response to a determination that a threshold number of the client devices 110A-110Z are consuming the live content item.

In one implementation, the streaming component 150 utilizes the content identification module 152 to identify content for including in a continuous content stream. Content may be identified, for example, from search results generated in response to a user-defined search query (e.g., by the search server 130), or based on behavior of a particular user or an aggregate of users. For example, recency of content viewed by a user, the user's watch history, the user's affinity for a particular source of content, etc., may be used to identify content relevant to the user for including in the continuous content stream.

In one implementation, the streaming component 150 utilizes the content screening module 154 to identify interesting portions of live content items that could potentially be scheduled for inclusion in the continuous content stream, for example, based on annotation data associated with the live content items (e.g., the annotation data 164A-164Z). The content screening module 154 may identify interesting portions in-real time. For example, interesting portions may be determined based on uptime of the live content item (e.g., a portion of the live content item may not be considered interesting if the live has experienced or is experiencing interruptions), a number of viewers of the live content item, a change in viewership of the live content item (rate at which users start or stop consuming the live content item), etc. In some implementations, the content screening module 154 may identify an interesting portion of a live content item based on an indication by a source of the content that the live content is currently at an interesting portion in response to a query transmitted by the content screening module 154.

In one implementation, the streaming component 150 utilizes the content insertion module 156 to identify insertion points for scheduling live and on-demand content to be played in the continuous content stream. The insertion points may be identified by one or more factors including, but not limited to, an actual start time of the live content item, a scheduled start and end time of the live content item, annotation data indicating intermissions in the live content item, a relative time within a currently viewed content item, whether a user is manually advancing or skipping the currently viewed content item, an estimated total session length for the user, or an estimation of when the user will consume a next content item.

In one implementation, the streaming component 150 utilizes the interface module 158 to enable content streaming from a content server (e.g., the content server 120) to a client device (e.g., one or more of the client devices 110A-110Z), in implementations in which the interface module 158 is implemented on the content server. In another implementation, the interface module 158, when implemented on a client device, supports a user interface for receiving and presenting content of the continuous content stream.

The modules of the streaming component are illustrated by way of example with respect to FIGS. 2A-2C and their associated description below.

FIGS. 2A and 2B illustrate an example user interface 200 presenting a continuous content stream in accordance with an implementation of the disclosure. For example, the user interface 200 may correspond to one of the respective user interfaces 112A-112Z of the client devices 110A-110Z. The user interface 200 includes a main region 202 (e.g., for displaying content) and a header region 204 (for displaying device information, etc.). The main region 202 includes a search box 206 for entering a search string, and a search button 208 that causes a search request for text entered into the search box 206 to be transmitted to a search engine (e.g., the search engine system 132). Content items 210, 212, and 214 may be returned as search results. In some implementations, the search aspect is omitted, and the user interface 200 may present content to a user (e.g., content items 210, 212, 214, and others not shown), for example, based on user preferences and user-specific content recommendations without requiring a user to request or select the content.

In one implementation, the content item 210 corresponds to a current content item that is being played by a client device implementing the user interface 200. The content item 210 may be a video, such as an on-demand video or a live video. In some implementations, a playback bar 216 with a corresponding playback indicator 218 may be displayed (e.g., overlaid on the content item 210, adjacent to the content item 210, etc.). A full-screen option 220 may also be displayed, which, when selected, causes the content item 210 to fitted to the dimensions of the user interface 200. The content item 212 may correspond to a content item that was previously played by the client device, partially played by the client device, or scheduled for playback but skipped (e.g., in response to the user advancing forward through a list of scheduled content items). The content item 214 may correspond to a next content item to be played. In one implementation, the content item 214 is a live content item, and may include a live content indicator 222.

In some implementations, if the user interface 200 is implementing a continuous content stream, each content item is played in a sequential fashion. For example, once the content item 212 ends (e.g., as a result of reaching an end of the content playback, in response to receiving a user input to advance/skip the content, etc.), the content item 210 then becomes the current content item being played by the client device. The content items 212 and 210 may appear to scroll up (and the content item 212 may be cropped depending on the dimensions of the user interface 200) such that the content item 210 appears at or near the center of the main region 202. The content item 214 may also appear in the main region (e.g., and may be cropped) as a result of the scrolling up of the content items 212 and 210. In some implementations, the user of the client device may control the playback of content items. For example, scrolling (up or down) may occur in response to a user input (e.g., scrolling using a mouse, a "finger swipe" if the client device has touch-screen capabilities, a voice command, etc.). In some implementations, an estimated end time of one or more displayed content items may be computed based on a scrolling rate.

Prior to commencement of playback of the content item 210, the content item 210 may have been represented as a static image (e.g., a representative frame from video of the content item 210, a title screen of the content item 210, etc.). In some implementations, the content item 210 may have been presented as a video. For example, the video may be muted (e.g., so as to not interfere with audio from the current content item), and may correspond to playback of highlights of the content (e.g., one or more designated interesting portions of the content item based on, for example, annotation data associated with the content item 210) or a live feed of the content item (e.g., if the content item 210 is a live content item).

Once playback of the content item 210 has commenced, the content item 212 may be displayed as a static image or as a video (e.g., as described above with respect to the content item 210). Similarly, the content item 214 (the next content item) may be displayed in a similar fashion. For example, since the content item 214 is a live content item, the content item 214 may be displayed as a live video feed if a representative static image and/or highlights are unavailable. Once playback of the content item 210 (the current content item) ends, the content items 210, 212, and 214 may scroll up within the main region 202. In this example user interface 200, the content item 212 may no longer be visible, the content item 210 may appear cropped, and the content item 214 may appear at or near the center of the main region 202, as illustrated in FIG. 2B. A new content item 224 (e.g., another live content item) may be identified as or may have been previously scheduled as (e.g., by the content insertion module 156) a next content item to be played immediately after the content item 214. In one implementation, a representation of the new content item 224 is displayed when the representations of content items 210 and 214 are shifted and space becomes available for the new content item 224.

In some implementations, the content items 210, 212, and 214 may be a subset of a larger set of content items identified for the purposes of playing in the continuous content stream. For example, the set of content items may have been identified by the content identification module 152, and the set may grow or shrink depending on various factors, such as the availability of live and/or on-demand content items. For example, if a user views particular content items and skips others, the content identification module 152 may identify new content items to add to the set of content items (and/or remove other content items from the set), with the new content items being similar to those that were viewed (e.g., based on similar genre, similar playback length, similar content sources, actors common between the content items, etc.). For each content item of the set, the content insertion module 156 may determine where to schedule the content item within the continuous content stream relative to other content items. For example, the content identification module 152 may have identified the live content item 214 before or during playback of the content item 210. The content screening module 154 may have identified interesting portions of the live content item 214 (e.g., based on annotation data associated with the live content item 214). The content insertion module 156 compute an estimated end time of the current content item (e.g., the content item 212) and/or the next content item to be played (e.g., the content item 210). In some implementations, the estimated end time may be based on a combination of end time estimates associated with each of the currently displayed content items.

The content insertion module 156 may then schedule the content item 214 to be played in the continuous content stream after the content item 210 based on the estimated end time. By scheduling in this way, the representation of the live content item 214 appears in the user interface 200 when there is a high likelihood that the live content item 214 will be playable at an interesting portion by the time playback of the currently displayed content items (e.g., the content items 210 and 212) have completed or have been advanced by the user. If the estimated end time does not coincide with an interesting portion of the live content item 214, the content insertion module 156 may schedule a different content item immediately after the content item 210, such that the a representation of the content item appears when the currently displayed content items scroll up. The functionality of the content insertion module 156 is described in greater detail below with respect to FIG. 2C.

Figure 2C:
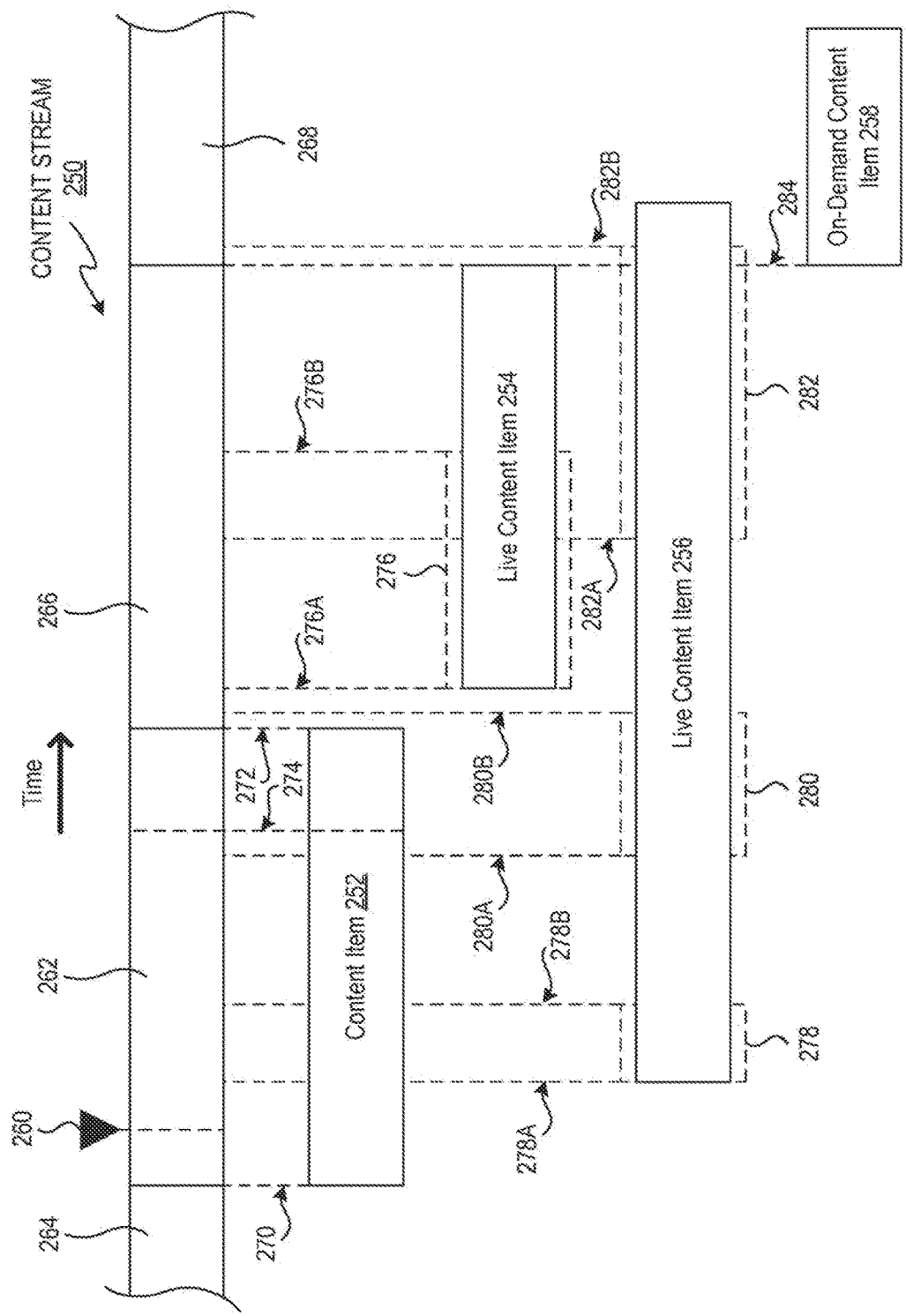
FIG. 2C is a block diagram illustrating insertion of live content items into a content stream in accordance with an implementation of the disclosure.

FIG. 2C is a block diagram illustrating the insertion of live content items into a content stream 250 in accordance with an implementation of the disclosure. The content stream 250 represents continuous content viewing experience provided to a user of a client device (e.g., one of the client devices 110A-110Z). As an illustrative example, a set of four content items have been identified (e.g., by the content identification module 152) for insertion into the content stream 250: content item 252 (which may be live content or on-demand content), live content item 254, live content item 256, and on-demand content item 258. Playback indicator 260 indicates a current playback position relative to a current content item 262 being played by the client device. Before the user watches the current content item 262 or during the playback of the current content item 262, a next content item 266 may be identified and scheduled for presentation by the client device (e.g., by the content insertion module 156). In some implementations, an indicator of the next content item may be displayed by the client device (e.g., the content item 214). In some implementations, more than one content item may be schedule for playing in the content stream 250, and the scheduled content items need not be consecutive (e.g., there may be an empty time slot between two scheduled content items until a suitable content item is identified and scheduled for the time slot).

As an example, content item 252 may correspond to the current content item 262, and may have been previously identified and scheduled in the content stream 250 (e.g., by the streaming component 150). The content item 252 may have an associated start time 270 and an associated end time 272 (e.g., which may be indicated by metadata associated with the content item 252). In some implementations, an estimated end time 274 may have been computed for the content item 252 (e.g., computed by the content screening module 154). The estimated end time 274 may be based at least partially on annotation data (e.g., the annotation data 164A) associated with the content item 252. For example, the content item 252 may have an associated annotation indicating where a credit reel begins, or may indicate a portion of the content that typically has a low amount of interest among a group of users. The estimated end time 274 may be based on these and other factors, such as user history (e.g., user history indicative of a tendency of the user to skip end portions or credits of content items), or aggregated user history (e.g., 90% of users typically skip over the content entirely or a portion of the content). In some implementations, the estimated end time 274 may be computed based on a rate at which a user is advancing content (e.g., the user may scroll through and browse the content items, as illustrated in FIGS. 2A and 2B). In some implementations, the estimated end time 274 may be the actual end time 272 if the content screening module 154 determines that it is highly probable that the user will watch the content item 252 in its entirety.

In one implementation, the content insertion module 156 determines which of the content items 254, 256, and 258 to schedule immediately following the content item 252, and may utilize the actual end time 272 or the estimated end time 274 of the content item 252 to determine an insertion point. The content screening module 154 may identify interesting portions of the live content items 254 and 256, and the content insertion module 156 may schedule one of the live content items 254 or 256 for playback as a next content item to be played after the current content item 262 (i.e., the content item 252). For example, the live content item 254 includes a single interesting portion 276 (which may correspond to some or all of the live content item 254). The interesting portion 276 includes a start time 276A and an end time 276B. As another example, the live content item 256 includes a first interesting portion 278 (with a start time 278A and an end time 278B), a second interesting portion 280 (with a start time 280A and an end time 280B), and a third interesting portion 282 (with a start time 282A and an end time 282B). The spaces between the various interesting portions of the live content item 256 may correspond to, for example, commercial breaks, as indicated by associated annotation data.

Since the first interesting portion 278 occurs during playback of the content item 252 and before the estimated end time 274, the live content item 256 will not be played. However, the content insertion module 156 may schedule the live content item 256 as the next content item 266, rather than the live content item 254, since the live content item 256 includes additional interesting portions. This may be based, for example, on the estimated end time 274 of the content item 252. Thus, if the user chooses to advance the content in the content stream 250, the live content item 256 will be played at a playback position within the second interesting portion 280. In some implementations, the content insertion module 156 may automatically cause the current content item to end prematurely based on an estimated end time (i.e., the estimated end time 174 of the content item 252). For example, if the estimated end time 274 coincides with the beginning of a credits reel, the content insertion module 156 may cause the credits reel to be skipped and begin playing the live content item 256 (provided that playback would occur during an interesting portion, such as the interesting portion 280).

In one implementation, if the content item 252 is estimated to be played back until the actual end time 272, the content insertion module 156 may instead schedule the live content item 254 to be played as the next content item 256, rather than the live content item 256 since the end time 280B may be too close to (e.g., within a pre-defined time duration of) the actual end time 272 of the content item 252. Although the content item 254 is not scheduled to begin at the end time 272, if the difference in time between the end time 272 and the start time 276A is within a pre-defined time duration (e.g., 5 seconds, 10 seconds, 15 seconds, 20 seconds, etc.), a countdown may be displayed in real-time in place of the scheduled content until playback of the live content item 254 commences. If the difference between the end time 272 and the start time 276A is outside of the pre-defined time duration, the content insertion module 156 may schedule a different content item (e.g., the on-demand content item 258) for playback as the next content item 266, as may correspond to an example scenario in which there are no remaining live content items suitable for including in the content stream 250 at the time the current content item 262 ends.

In one example, if the live content item 256 was scheduled as the next content item 256, the content insertion module 156 may schedule the live content item 254 as a next content item to be played after the end time 280B if the different in time between the end time 280B and the start time 276A are within a pre-defined range. In another example, if the live content item 254 is played and reaches the end time 276B, the content insertion module 156 may schedule the live content item 256 to play due to the overlap between the interesting portion 276 of the live content item 254 and the interesting portion 282 of the live content item 256. In another example, once one of the live content items 254 or 256 begins playing, the live content item may continue to play until its respective end time (e.g., which may be independent of any identified interesting portions). The on-demand content item 258 may be scheduled as a next content item immediately following the live content item 254 or the live content item 256. For example, if the live content item 254 is played until its end, a remaining time of the live content item 256 may be too short (e.g., less than a pre-defined time duration) to justify scheduling by the content insertion module 156, and the on-demand content item 258 (or another suitable content item) may be scheduled as the next content item 268.

The streaming component 150 was described as being implemented by the content server 120 described with respect to FIG. 1A, but may be implemented by any of the client devices 110A-110Z or the search server 130. For example, a client device (e.g., client device 110A) may be programmed to perform all of the functions of the streaming component 150. When the streaming component 150 is implemented on a client device, any functions described with respect to the streaming component 150 that "schedule", "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

Figure 3:
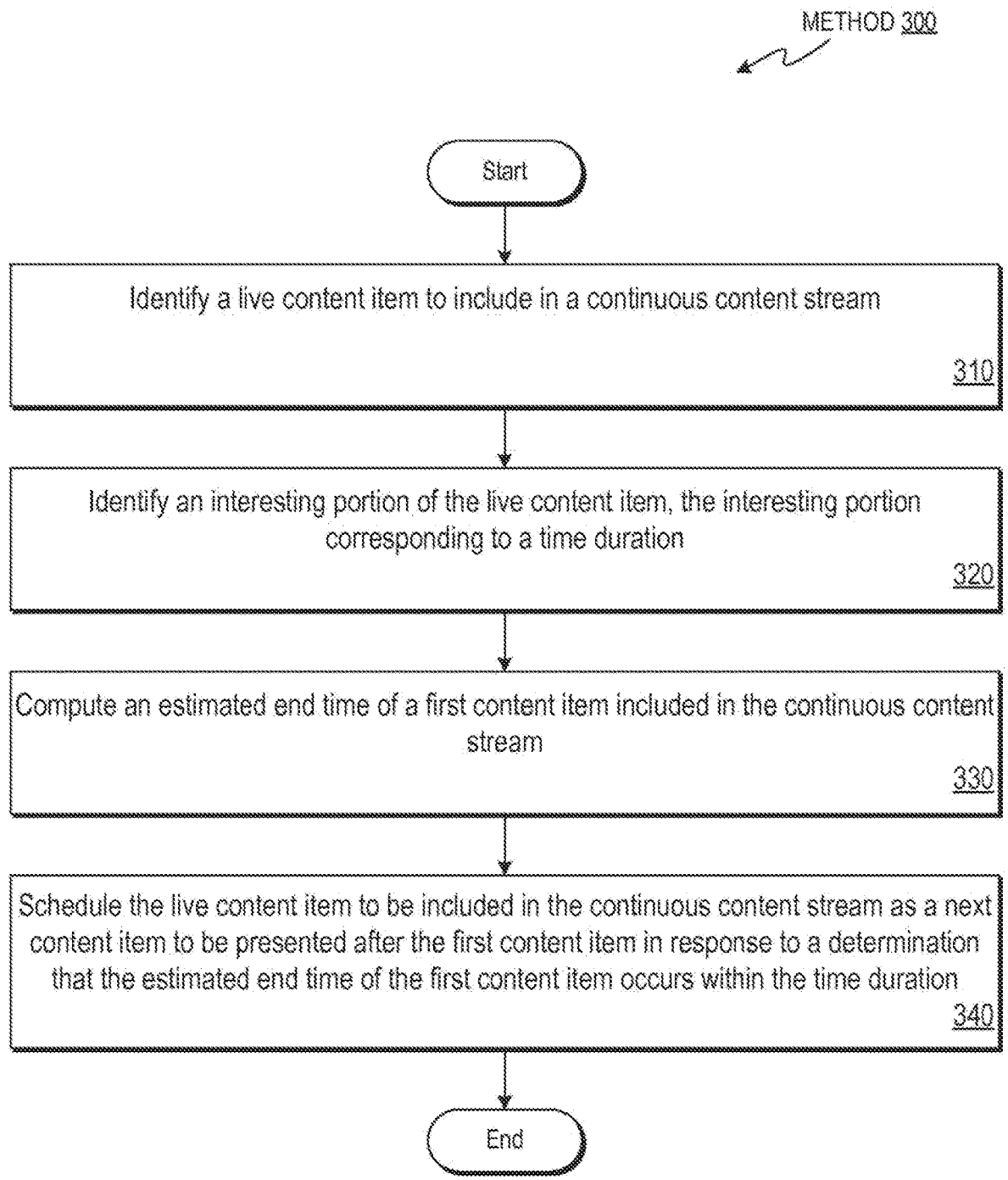
FIG. 3 is a flow diagram illustrating a method for inserting live content into a continuous content stream in accordance with an implementation of the disclosure.
Figure 4:
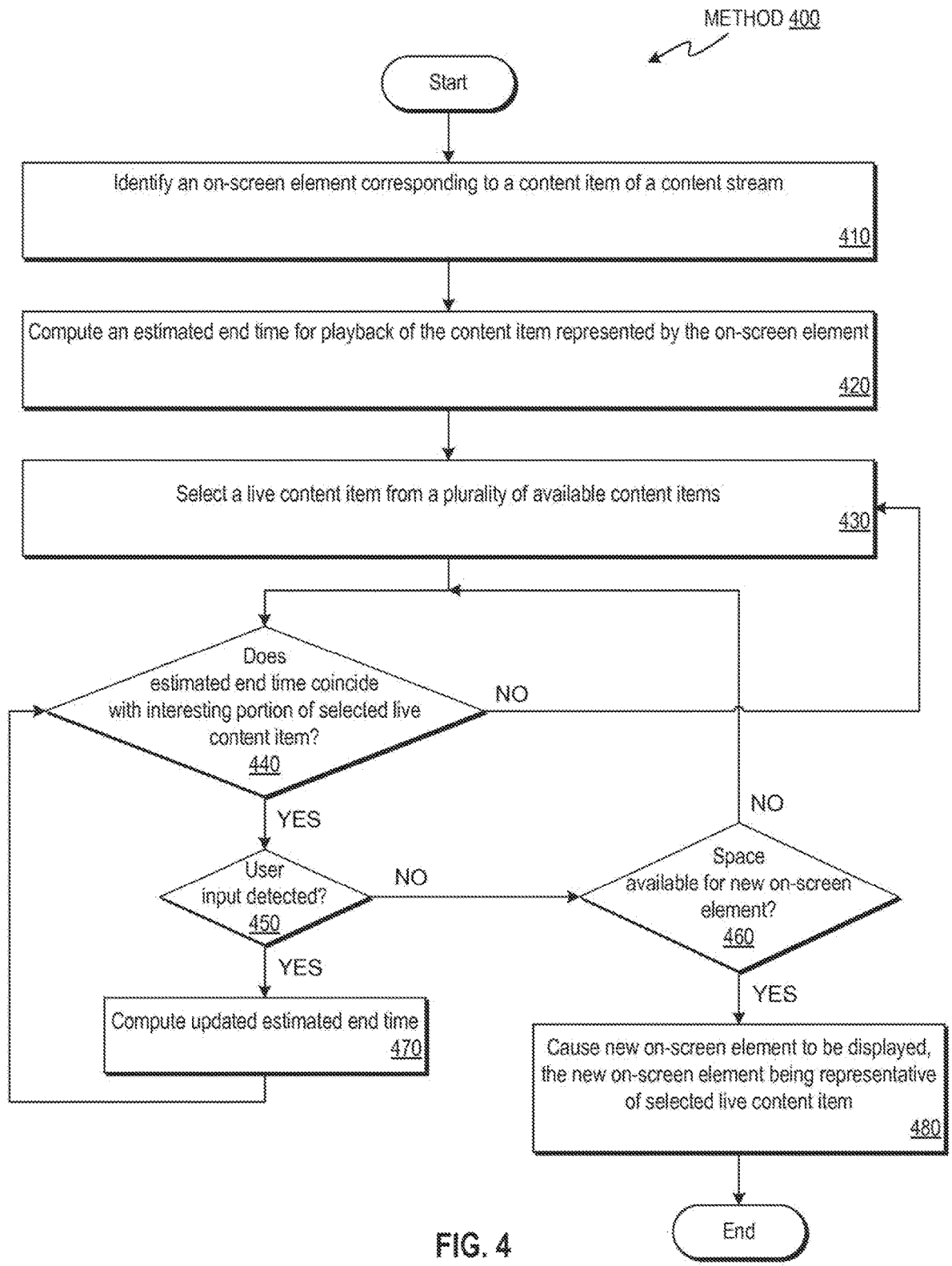
FIG. 4 is a flow diagram illustrating a method for generating a preview of a live content item to be presented in a content stream in accordance with an implementation of the disclosure.

FIG. 3 is a flow diagram illustrating a method 300 for inserting live content into a continuous content stream in accordance with an implementation of the disclosure. FIG. 4 is a flow diagram illustrating a method 400 for generating a preview of a live content item to be presented in a content stream in accordance with an implementation of the disclosure. The methods 300 and 400 may be performed by processing logic that includes hardware (e.g., circuitry, dedicated logic, programmable logic, microcode, etc.), software (e.g., instructions run on a processing device to perform hardware simulation), or a combination thereof. In one implementation, the methods 300 and 400 may each be performed by a processing device executing the streaming component 150 described with respect to FIGS. 1A and 1B. In one implementation, the methods 300 or 400 are executed by a processing device of a server (e.g., the content server 120 or the search server 130). In another implementation, the methods 300 or 400 are executed by a processing device of a client device (e.g., one of the client devices 110A-110Z).

Referring to FIG. 3, the method 300 begins at block 310 when a processing device identifies a live content item to include in a continuous content stream (e.g., to be transmitted or currently transmitted to a client device, such as one of the client devices 110A-110Z). In one implementation, identifying the live content item includes identifying the live content item based on one or more of a user search query, a user watch history, a social annotation, recently watched content, a popularity indicator, a content channel associated with currently viewed content, or a user affinity for a content source. In some implementations, other criteria for identifying the live content item may be used. In one implementation, the identifying is performed at a content server 120 or a search server 130 using the content identification module 152 or the search engine system 132, respectively. In some implementations, the identifying is performed by one of the client device (e.g., the client device 110A) by identifying the live content item within a list of content received from the content server 120, the search server 130, or another source.

At block 320, the processing device identifies an interesting portion of the live content item. The interesting portion may correspond to a time duration. In some implementations, identifying the interesting portion of the live content item includes identifying the interesting portion based on an annotation associated with the live content item (e.g., annotation data 164A associated with the content record 160A for the live content item). In some implementations, identifying the interesting portion of the live content item includes transmitting, to a content server (e.g., the content server 120), a request for confirmation that the estimated end time occurs within the time duration of the interesting portion of the live content item, and receiving confirmation from the content server.

At block 330, the processing device computes an estimated end time of a first content item included in the continuous content stream. In one implementation, computing the estimated end time of the first content item includes computing the estimated end time based on one or more of a user input received by client device requesting advancement of content items in the continuous content stream, estimated end times of one or more content items in the continuous content stream scheduled before the first content item, viewer history of the first content item, or an annotation associated with the first content item.

In one implementation, the first content item is an on-demand content item. In one implementation, the first content item is a live content item. In one implementation, the first content item is currently being presented for display by a client device. In one implementation, the first content item is scheduled to be presented for display by the client device.

At block 340, the processing device schedules the live content item to be included in the continuous content stream as the next content item to be presented after the first content item. Block 340 may be performed in response to a determination by the processing device that the estimated end time of the first content item occurs within the time duration. In one implementation, in response to a determination by the processing device that the estimated end time of the first content item occurs outside of the time duration, the processing device may schedule a second content item (i.e., in lieu of the live content item) to be included in the continuous content stream as the next content item to be presented after the first content item.

In one implementation, in response to a determination by the processing device that the estimated end time of the first content item occurs within a pre-determined amount of time before the time duration, the processing device may schedule the live content item to be included in the continuous content stream as the next content item to be presented after the first content item. In one implementation, if the processing device is a processing device of a client device, the processing device may cause a countdown to be displayed by the client device, with the countdown indicating an amount of time remaining before the live content item is to be presented by the client device. In one implementation, the pre-determined time may be 5 seconds, 10 seconds, 15 seconds, 20 seconds, 25 seconds, 30 seconds, one minute, or any other suitable time duration. For example, the client device may present for display an on-demand video. When the video ends, a countdown of 15 seconds may be displayed along with an indication that the live content item will be begin after the countdown (e.g., the live content item will be presented in the continuous content stream at the start of the time duration corresponding to the interesting portion).

Referring to FIG. 4, method 400 begins at block 410 when a processing device identifies an on-screen elements corresponding to a content item (e.g., the content item 210, the content item 214, etc.). The content item may be a current content item or a next content item to be played. The on-screen elements may be a representation of a content item, including, but not limited to, video of the content item (e.g., live or pre-recorded content, a highlights reel, a preview video, etc.), a thumbnail (e.g., a title screen, a video frame), or a countdown indicator. The on-screen element, and other on-screen elements, may be presented as illustrated in the user interface 200 described with respect to FIGS. 2A and 2B, or according to any other suitable arrangement.

At block 420, the processing device computes an estimated end time for playback of the content item represented by the on-screen element. The estimated end time may be computed in accordance with any of the implementations described herein. In one implementation, the estimated end time corresponds to an actual end time of the content item. In one implementation, the estimated end time takes into account estimated end times of additional content items represented by additional on-screen elements. In one implementation, the estimated end time may coincide with a time at which space is (or is estimated) to become available for display of a new on-screen element representative of a next content item to be played in the content stream.

At block 430, the processing device selects a live content item from a plurality of available content items. In one implementation, the plurality of available content items includes live and on-demand content items (e.g., identified by the content identification module 152. At block 440, the processing device determines whether the estimated end time coincides with an interesting portion of the selected live content item (e.g., the estimated end time falls within a time duration associated with the interesting portion). If the processing device determines that the estimated end time does not coincide with the interesting portion of the selected content item, then the method 400 proceeds back to block 430, where a new live content item is selected from the plurality of available content items. In one implementation, if there are no additional live content items to select, an on-demand content item may be scheduled as a next content item to be played, and an on-screen element representing the on-demand content item is displayed.

If the processing device determines that the estimated end time coincides with the interesting portion of the selected live content item, then the method 400 proceeds to block 450. At block 450, the processing device determines if a user input is detected. For example, the user input may be a request to advance a currently played content item or skip to a next content item (e.g., a finger-swipe of a display screen of a client device). If the processing device detects the user input, then the method 400 proceeds to block 470, where the processing device computes an updated estimated end time (e.g., based on the user input). The method then proceeds back to block 440.

At block 450, if the user input is not detected, then the method 400 proceeds to block 460, where the processing device determines if space is available for the new on-screen element (e.g., as illustrated in the shift of content items 210 and 214 between FIGS. 2A and 2B). The processing device may determine that the space has or will become available based on the estimated end time. For example, after playback of a current video ends, the arrangement of on-screen elements may change/shift to commence playback of the next content item. If the processing device determines that no space is available for the new on-screen element, then the method 400 proceeds back to block 440. If the processing device determines that space is available for the new on-screen element, then the method 400 proceeds to block 480, where the processing device causes the new on-screen element to be displayed, the new on-screen element being representative of the selected live content item. The method 400 ends after block 480, and may be repeated continuously from block 410.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Although implementations of the disclosure were discussed in terms of identifying insertion points for inserting live content into a continuous content stream, the implementations may also be generally applied to any system in which consumable content is identified, arranged, or edited. Thus, implementations of the disclosure are neither limited to continuous content streams nor those that combine live and on-demand content. Moreover, although video content is described in various examples, the various implementations described herein may also be applicable to audio content.

Figure 5:
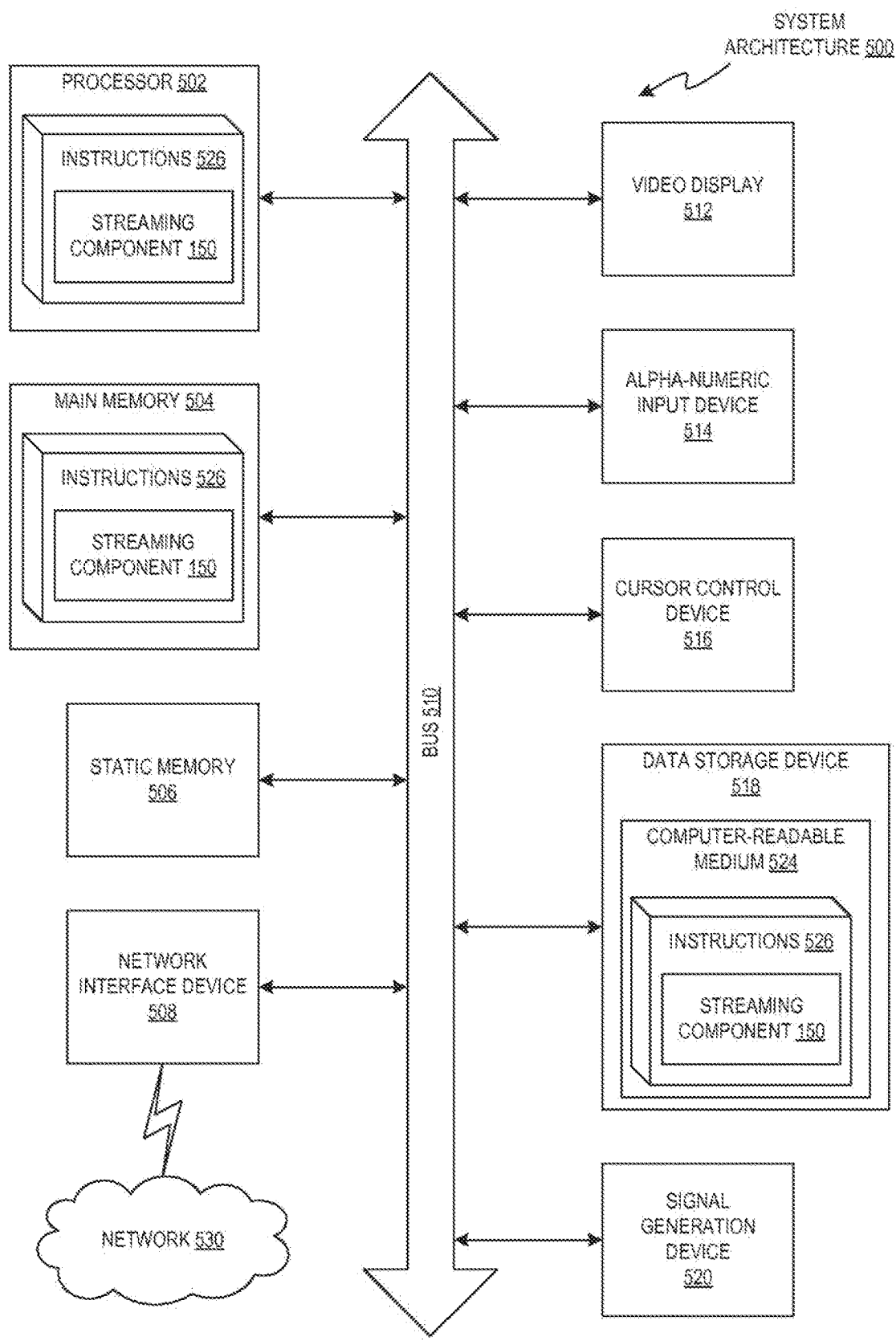
FIG. 5 is a block diagram illustrating an exemplary computer system in accordance with an implementation of the disclosure.

FIG. 5 illustrates a diagrammatic representation of a machine in the exemplary form of a computer system 500 within which a set of instructions (e.g., for causing the machine to perform any one or more of the methodologies discussed herein) may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 500 may be utilized by or illustrative of any of the client devices 110A-110Z, the data store 106, the content server 120, and the search server 130.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 510.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 508. The computer system 500 also may include a video display unit 512 (e.g., a liquid crystal display (LCD), a cathode ray tube (CRT), or a touch screen), an alphanumeric input device 514 (e.g., a keyboard), a cursor control device 516 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 530 (e.g., the network 105) via the network interface device 508.

In one implementation, the instructions 526 include instructions for one or more streaming components 150, which may correspond to the identically-named counterpart described with respect to FIGS. 1A and 1B. While the computer-readable storage medium 524 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "transmitting", "generating", "adding", "substracting", "removing", "analyzing", "determining", "enabling", "identifying", "modifying", "scheduling", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a first particular content item included in a content stream;
   identifying, by the processing device, a first live content item comprising one or more interesting portions identified based on one or more content selection criteria, wherein at least one of the one or more content selection criteria reflects a real time viewership metric corresponding to the first live content item;
   determining, by the processing device, to present the first live content item based on the one or more interesting portions of the first live content item, wherein a first interesting portion of the one or more interesting portions of the first live content item comprises a start time of the first interesting portion; and
   causing, by the processing device, the first live content item to be presented by a client device at the start time of the first interesting portion during playback of the first particular content item.

2. The method of claim 1, further comprising:
   scheduling, by the processing device, a second particular content item to be included in the content stream as a next content item to be presented after the first particular content item in response to a determination that an estimated end time of the first particular content item is to occur outside of a time duration of the first live content item.

3. The method of claim 1, further comprising:
   scheduling, by the processing device, the first live content item to be included in the content stream as a next content item to be presented after the first particular content item in response to a determination that an estimated end time of the first particular content item is to occur within a pre-determined amount of time before a time duration of the first live content item; and
   causing, by the processing device, a countdown to be displayed by the client device, the countdown indicating an amount of time remaining before the first live content item is to be presented by the client device.

4. The method of claim 1, wherein the one or more content selection criteria comprises one or more of a user search query, a user watch history, a social annotation, recently watched content, a popularity indicator, a content channel associated with currently viewed content, or a user affinity for a content source.

5. The method of claim 1, wherein identifying the first interesting portion of the first live content item comprises identifying the first interesting portion based on an annotation associated with the first live content item.

6. The method of claim 1, wherein identifying the first interesting portion of the first live content item comprises:
   transmitting, to a content server, a request for confirmation that an estimated end time of the first particular content item is to occur within a time duration of the first interesting portion of the first live content item; and
   receiving confirmation from the content server.

7. The method of claim 1, further comprising:
   computing an estimated end time of the first particular content item based on one or more of a user input received by client device requesting advancement of content items in the content stream, estimated end times of one or more content items in the content stream scheduled before the first particular content item, viewer history of the first particular content item, or an annotation associated with the first particular content item.

8. The method of claim 1, wherein the first particular content item is currently being presented for display by the client device or is scheduled to be presented for display by the client device.

9. The method of claim 1, further comprising:
   scheduling, by the processing device, a second live content item to be included in the content stream as a next content item to be presented after an end time of the first interesting portion of the first live content item in response to a determination that the end time of the first interesting portion of the first live content item is to occur within a pre-defined range of time before a second start time of a second interesting portion of the second live content item.

10. The method of claim 9, further comprising:
    scheduling, by the processing device, a third live content item to be included in the content stream as the next content item to be presented after a second end time of the second interesting portion of the second live content item in response to a second determination that the second end time of the second interesting portion of the second live content item is to occur within a third start time of a third interesting portion of the third live content item.

11. The method of claim 10, wherein the third live content item is the first live content item.

12. A non-transitory machine-readable medium having instructions encoded thereon that, when executed by a processing device, cause the processing device to:
    identify a first particular content item included in a content stream;
    identify a first live content item comprising one or more interesting portions identified based on one or more content selection criteria, wherein at least one of the one or more content selection criteria reflects a real time viewership metric corresponding to the first live content item;
    determine to present the first live content item based on the one or more interesting portions of the first live content item, wherein a first interesting portion of the one or more interesting portions of the first live content item comprises a start time of the first interesting portion; and
    cause the first live content item to be presented by a client device at the start time of the first interesting portion during playback of the first particular content item.

13. The non-transitory machine-readable medium of claim 12, wherein the instructions further cause the processing device to:

schedule the first live content item to be included in the content stream as a next content item to be presented after the first particular content item in response to a determination that an estimated end time of the first particular content item is to occur within a pre-determined amount of time before a time duration of the first live content item; and cause a countdown to be displayed by the client device, the countdown indicating an amount of time remaining before the first live content item is to be presented by the client device.

14. The non-transitory machine-readable medium of claim 12, wherein the instructions further cause the processing device to:

schedule a second live content item to be included in the content stream as a next content item to be presented after an end time of the first interesting portion of the first live content item in response to a determination that the end time of the first interesting portion of the first live content item is to occur within a pre-defined range of time before a second start time of a second interesting portion of the second live content item.

15. The non-transitory machine-readable medium of claim 14, wherein the instructions further cause the processing device to:

schedule a third live content item to be included in the content stream as the next content item to be presented after a second end time of the second interesting portion of the second live content item in response to a second determination that the second end time of the second interesting portion of the second live content item is to occur within a third start time of a third interesting portion of the third live content item.

16. The non-transitory machine-readable medium of claim 15, wherein the third live content item is the first live content item.

17. A system comprising:
a memory; and
a processing device communicatively coupled to the memory, wherein the processing device is to:

identify a first particular content item included in a content stream;

identify a first live content item comprising one or more interesting portions identified based on one or more content selection criteria, wherein at least one of the one or more content selection criteria reflects a real time viewership metric corresponding to the first live content item;

determine to present the first live content item based on the one or more interesting portions of the first live content item, wherein a first interesting portion of the one or more interesting portions of the first live content item comprises a start time of the first interesting portion; and cause the first live content item to be presented by a client device at the start time of the first interesting portion during playback of the first particular content item.

18. The system of claim 17, wherein the processing device is further to:

schedule a second live content item to be included in the content stream as a next content item to be presented after an end time of the first interesting portion of the first live content item in response to a determination that the end time of the first interesting portion of the first live content item is to occur within a pre-defined range of time before a second start time of a second interesting portion of the second live content item.

19. The system of claim 18, wherein the processing device is further to:

schedule a third live content item to be included in the content stream as the next content item to be presented after a second end time of the second interesting portion of the second live content item in response to a second determination that the second end time of the second interesting portion of the second live content item is to occur within a third start time of a third interesting portion of the third live content item.

20. The system of claim 19, wherein the third live content item is the first live content item.

* * * * *